(12) United States Patent
Thorburn et al.

(10) Patent No.: US 8,212,411 B2
(45) Date of Patent: Jul. 3, 2012

(54) SYSTEM FOR GENERATING ELECTRIC ENERGY

(75) Inventors: Karin Thorburn, Västerås (SE); Mats Leijon, Uppsala (SE)

(73) Assignee: Seabased AB, Uppsala (SE)

( * ) Notice: Subject to any disclaimer, the term of this patent is extended or adjusted under 35 U.S.C. 154(b) by 268 days.

(21) Appl. No.: 12/225,661

(22) PCT Filed: Mar. 29, 2006

(86) PCT No.: PCT/SE2006/050047
§ 371 (c)(1),
(2), (4) Date: Dec. 2, 2008

(87) PCT Pub. No.: WO2007/111546
PCT Pub. Date: Oct. 4, 2007

(65) Prior Publication Data
US 2010/0033016 A1    Feb. 11, 2010

(51) Int. Cl.
F03B 13/10    (2006.01)
(52) U.S. Cl. ............................. 307/84; 209/42
(58) Field of Classification Search .................... 307/84; 290/42
See application file for complete search history.

(56) References Cited

U.S. PATENT DOCUMENTS

| | | | |
|---|---|---|---|
| 4,539,485 A * | 9/1985 | Neuenschwander | 290/53 |
| 4,781,023 A * | 11/1988 | Gordon | 60/506 |
| 5,359,229 A * | 10/1994 | Youngblood | 290/53 |
| 5,909,060 A | 6/1999 | Gardner | |
| 6,020,653 A * | 2/2000 | Woodbridge et al. | 290/53 |
| 6,133,644 A * | 10/2000 | Smith et al. | 290/53 |
| 6,531,788 B2 * | 3/2003 | Robson | 290/43 |
| 6,700,217 B1 * | 3/2004 | North et al. | 290/53 |
| 6,812,588 B1 * | 11/2004 | Zadig | 290/53 |
| 6,833,631 B2 * | 12/2004 | Van Breems | 290/42 |
| 7,045,912 B2 | 5/2006 | Leijon et al. | |
| 7,215,036 B1 * | 5/2007 | Gehring | 290/54 |
| 7,304,399 B2 * | 12/2007 | Leijon et al. | 290/42 |
| 7,405,489 B2 * | 7/2008 | Leijon et al. | 290/42 |
| 2005/0121915 A1 * | 6/2005 | Leijon et al. | 290/42 |
| 2006/0055175 A1 * | 3/2006 | Grinblat | 290/54 |

FOREIGN PATENT DOCUMENTS

WO    03058055    7/2003

* cited by examiner

*Primary Examiner* — Adi Amrany
(74) *Attorney, Agent, or Firm* — Dykema Gossett PLLC

(57) ABSTRACT

A system for generating electric energy from renewable energy sources such as waves includes a plurality of generator aggregates (4a-6c) arranged in the sea and a plurality of switchgears (1a-1c) arranged in the sea. Each switchgear (1a-1c) is connected to a plurality of the generator aggregates (4a-6c). A plurality of primary intermediate stations (17a-17c) are respectively connected to a plurality of the switchgears, and a secondary intermediate station (19) is connected to a plurality of the primary intermediate stations (17a-17c). The secondary intermediate station is also connected to a land based electric network. Switching means (192) is present for allowing selective connection to various locations (193, 194, 195) in the electric network.

23 Claims, 5 Drawing Sheets

SYSTEM FOR GENERATING ELECTRIC ENERGY

TECHNICAL FIELD

The present invention relates to a system for generating electric energy from renewable energy sources, the system including a plurality of generator aggregates.

The invention also relates to an electric network and a method for supplying energy to an electric network.

By the expression sea in the present application is to be understood to include large inland lakes.

BACKGROUND OF THE INVENTION

Wave movements in the sea and in large inland lakes constitute a potential source of energy that have been scarcely exploited so far. The same relates to underwater streams in the sea and to the wind above the sea. Although there have been a lot of different suggestions for generator aggregates utilizing these renewable energy sources for powering the generator, the amount of energy produced in this way is neglectable. The main reasons for that are economical. It is problematic to achieve aggregates of this kind that are economically competitive. Normally the power output from these aggregates is very small. Therefore, a large number of such aggregates are required to attain power of a significant level that can compete with conventional energy sources such as hydropower, nuclear power and aggregates powered by fossil fuels.

The challenge to achieve an economical competitive energy generating system based on these renewable energy sources is on one hand to provide efficient generator aggregates at low costs and on the other hand to provide an optimized system that can include a large number of such generator aggregates. The latter aspect is the crucial one for producing and supplying energy on a large commercial scale for the supply of the electric energy to an electric network. The present invention is focused on that aspect.

WO 03/058055 discloses a wave-power unit, including a linear generator. The unit is of a design such that it effectively generates electric energy at a comparatively low cost. This reference also discloses how a plurality of the units can be connected to a plurality of switchgears, each switchgear being connected to an intermediate station supplying the energy to a land based receiving station. Thus the reference discloses a system including many generator aggregates, the output from which is collected into a cable between the intermediate station and the land based receiving station. The disclosed system therefore is capable of providing electric energy at a power many times higher than that from a single generator aggregate. Typically a single aggregate deliver at a power level of 10 kW and the system in total will be able to supply energy at a power in the order of 300 kW.

However, this in most cases is far from sufficient to achieve a competitive energy supply system. Furthermore the disclosed system is limited to supplying to a particular location on land that can be connected to an electric network.

The object of the present invention is to provide a system for generating electric energy from renewable energy sources that is technically and commercially competitive for supplying the energy to a general electric network.

Another object is to provide a system allowing a high degree of flexibility regarding the supply to the network.

DESCRIPTION OF THE INVENTION

The objective set is achieved in that a system of the kind in question includes the specific features, that the system includes a plurality of primary intermediate stations and at least one secondary intermediate station, each primary intermediate station being connected to a plurality of said switchgears, the at least one secondary intermediate station being connected to a plurality of said primary intermediate station and to a land based electric network and the system includes switching means allowing selective connection of the at least one secondary intermediate station to various locations in the electric network.

By providing intermediate station on at least two levels in a cascade-connection according to the invention it will be possible to create a system with a very large number of generator aggregates such that the common output of the system will be at a level enough to be competitive also when supplying to a general network. By connecting the secondary intermediate station to about ten primary intermediate stations, connecting each primary intermediate station to about five switchgears and connecting each switchgear to about ten generator aggregates, the output of the system will be on a level of 5 MW if each generator aggregate has a power of 10 kW.

The cascade connection based on the principle of collecting a plurality of generator aggregates to a switchgear, connecting a plurality of such switchgears to a primary intermediate station and connecting a plurality of such primary intermediate stations to a secondary intermediate station has many advantages:

A system of a very large number of generate aggregates becomes very logical and structured due to the cascade pattern which makes the system easy to supervise and simplifies the maintenance.

Should a failure occur in a part of the system, the rest of the system will be able to operate unaffected.

All the switchgears can be practically identical as also all of the primary intermediate stations, which allow a cost-effective manufacture of these components.

Each of these components can be designed for a well-defined task, a well-defined power level and includes well-defined components allowing a rational manufacture and maintenance thereof.

The structural pattern minimizes losses since the cables and the electric parameters of the current can be optimally adapted to each level in the system.

By designing the system such that it can be connected to different parts in an electric network the system offers a high degree of flexibility.

The invented system thus allows generation of electric power from these renewable power sources at high power and at a commercially competitive scale and results in high flexibility.

According to a preferred embodiment the system includes a plurality of secondary intermediate stations being connected to a plurality of the primary intermediate station.

Thereby the system will be adapted to include still more generator aggregates. According to a further preferred embodiment the system includes a tertiary intermediate station, the tertiary intermediate station being connected to a plurality of the secondary intermediate stations.

This represents a system where the step to a further level in the cascade pattern is completed. If the tertiary intermediate station is connected to eight secondary intermediate stations the power from the tertiary intermediate station will be at a level of 40 MW. This embodiment thus accentuates the advantages of the cascade connection patterns mentioned above in cases where a corresponding large number of generator aggregates can be employed.

According to a further preferred embodiment at least some of the primary intermediate stations are located in the sea.

According to a further preferred embodiment at least one of the secondary intermediate stations is located in the sea.

According to a further preferred embodiment also the tertiary intermediate station is located in the sea.

Providing primary and in some cases also secondary intermediate stations and even the tertiary intermediate station in the sea allows the system to be used also for generator aggregates that are located far from the shore and supplying the power to land by means of as few cables as possible. This increases the efficiency of the system. Normally the available energy from waves and wind is higher on far distances from the shore.

By arranging the stations in the sea the primary intermediate stations can be located close to the switchgears and the second intermediate stations closed to the primary intermediate stations etc. Such a localisation minimizes the losses.

According to a further preferred embodiment each switchgear includes a watertight container fixed to the sea bed, the container housing at least some of the switchgear components.

This offers a comprehensive solution where the switchgears can be constructed as standard modules using standard components. The container offers protection against the surrounding water.

According to a further preferred embodiment at least some of the primary intermediate stations and/or at least some of the secondary intermediate stations include a watertight container fixed to the sea bed, the container housing at least some of the station components.

This embodiment results in advantages of corresponding kinds as those gained by arranging the switchgear in the similar way and which have been described above. According to a further preferred embodiment at least some of the generator aggregates include wave powered means.

Wave powered generator aggregates more than other alternatives represent the situation where the number of aggregates is large and the power of each aggregate is low. Since the system according to the present invention is particularly designed for such applications its advantages are particularly useful when applied to wave powered generator aggregates.

According to a further preferred embodiment the generator of at least some of the wave powered generator aggregates is a linear generator having a reciprocating rotor including permanent magnets.

When the generator is wave powered the use of a linear generator has advantages in that the movements of the float on the sea surface can be utilized directly without transferring the movements into rotational movements.

According to further preferred embodiments at least some of the generator aggregates are generators powered by wind or water streams.

In many cases it is advantageous to apply the system to these types of energy sources, either only one of these types or both or alternatively in combination with wave powered generators.

According to a further preferred embodiment the system includes AC/DC-rectifiers and/or DC/AC-inverters, the rectifiers/inventors being housed in the switchgears and/or in the intermediate stations.

By means of these devices the system can be optimized regarding the transmission of the power such that the appropriate type of current can be selected for the cable connections at different levels of the system.

According to a further preferred embodiment at least some of the rectifiers include a diode or a thyristor bridge.

Thereby a simple and reliable rectification can be performed

According to a further preferred embodiment at least some of the switchgears and/or the intermediate stations include a transformer.

By including a transformer in the switchgears/intermediate station the current can be transformed to levels which are optimized for the cable conditions at different levels of the system.

According to a further preferred embodiment the generator aggregates are connected to the switchgears by AC-cables.

For the transmission from the aggregates to the switchgears AC normally is the most appropriate alternative.

According to a further preferred embodiment, the connections between the switchgears and the primary intermediate stations and/or the connections between the intermediate stations include AC-cables or DC-cables respectively.

For these connections AC might be superior in some applications and DC superior in others, and the optimization of to which extent and at which level AC or DC are to be used depend on the actual conditions at which the system operates.

According to a further preferred embodiment at least some of the primary intermediate stations are provided with a control and governing system for the DC-parts.

Such a control and governing system helps to assure adaption to the various conditions that prevail for the system.

According to a further preferred embodiment at least one of the secondary or tertiary intermediate stations is land based and includes a superior control system arranged to control the system for generating energy.

This is advantageous for adapting the system to the electrical network to which the energy is supplied and for generally adapting the system to the operating conditions.

According to a further preferred embodiment at leas one of the secondary or tertiary intermediate stations is land based and includes a billing system.

If the size of this system is limited a land based location provides a technically easier construction of the station. The billing system provides a possibility to obtain an adequate billing of the energy supplied.

According to a further preferred embodiment at least some of the switchgears and the intermediate stations include a relay protection device.

Such a device represents convenient measures for avoiding failures in the system. According to a further preferred embodiment at least some of the switchgears and the intermediate stations include a measuring system arranged to measure current related parameters.

Measuring these parameters forms an important role in the control and governing of the system and helps to optimize it.

According to a further preferred embodiment, the system includes a signalling system arranged to transmit information signals and/or actuating signals to and from at least some of the switchgears and/or the intermediate stations.

Providing information in this way from the different parts of the system is another important link for the control. Actuating signals are correspondingly important for the governing.

According to a further preferred embodiment the signalling system includes signalling means selected from the group consisting of optical fibre, cables, acoustic signalling means, radio signalling means and floats.

All these signalling means may be employed in one and the same system. In many cases, however, only one or a few of them are present. The optimal choice of what kind of signalling means that are to used depends on various aspects such as external conditions, the size of the system, the degree of sophistication of the system etc.

According to a further preferred embodiment the stator winding of at least some of the generator aggregates include a cable having solid insulation, the solid insulation including an inner semiconducting layer and outer semiconducting layer and an intermediate insulation layer.

This type of stator winding is known per se and has advantageous electrical properties due to the circular shape resulting in a homogenous electrical field. Since voltage can be kept high with such a winding a step-up transformer can be eliminated in connection with the generator aggregate. The advantages of this kind of winding are particularly accentuated when used in generator aggregates in a system according to the invention.

According to the invented method electric energy is supplied to an electric network by connecting a system according to the present invention or any of the preferred embodiments thereof to the electric network.

According to the invented electric network it is connected to a system according to the present invention or any of the preferred embodiments thereof.

The invented method and the invented network offer corresponding advantages as those gained by the invented system and the preferred embodiments thereof and which have been explained above.

The invention will be explained more clearly by the following detailed description of advantageous examples of the invention and with reference to the accompanying drawings.

DETAILED DESCRIPTION OF ADVANTAGEOUS EXAMPLES

Figure 1:
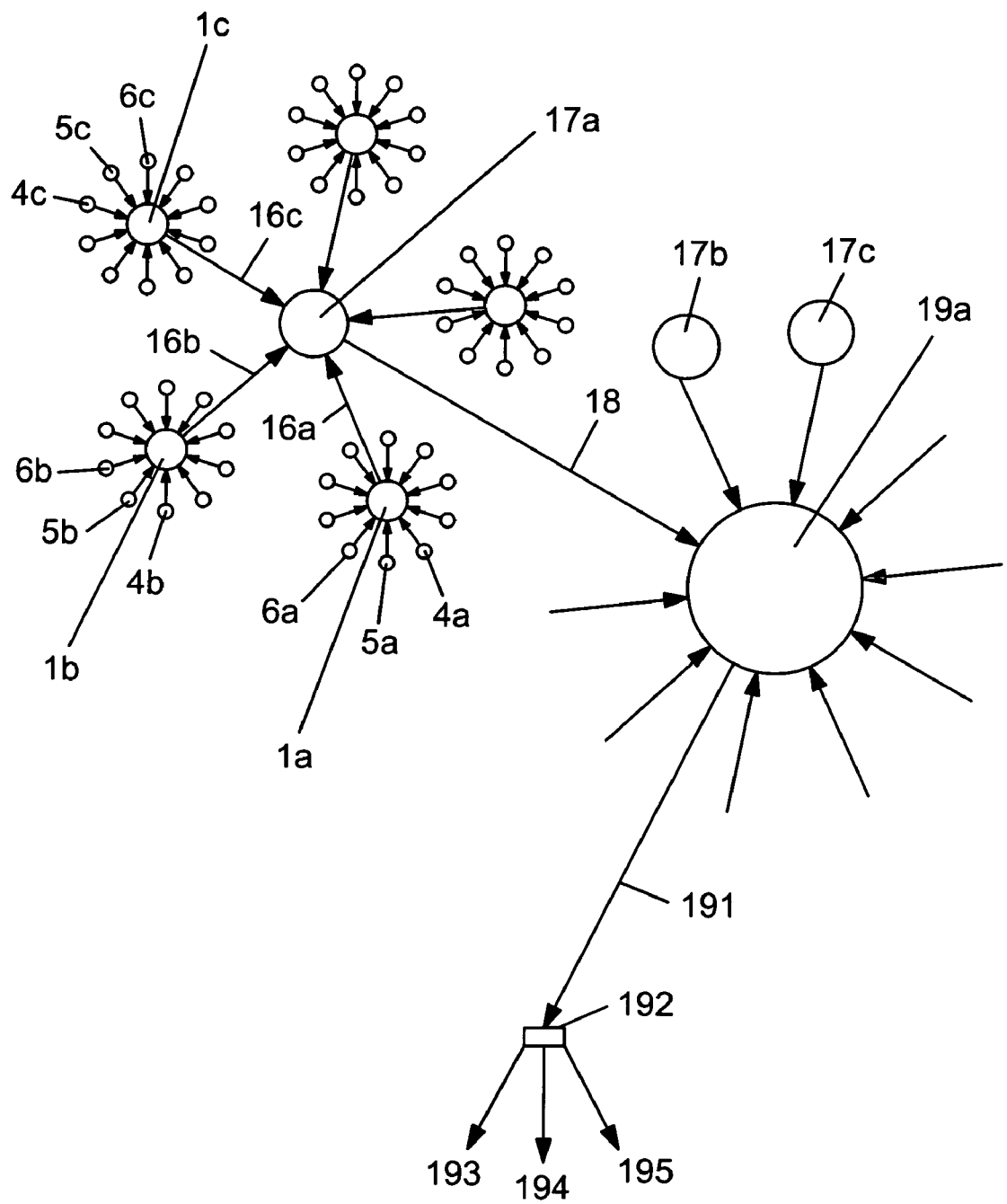
FIG. 1 is a scheme illustrating a system according to a first example of the invention.

FIG. 1 schematically illustrates a first example of a system according to the present invention.

A plurality of generator aggregates 4a, 5a, 6a etc., are arranged in the sea and connected to a common switchgear 1a in the sea. A plurality of such switchgears 1a, 1b, 1c, etc., are by means of cables 16a, 16b, 16c connected to a primary intermediate station 17a in the sea. Each of the switchgears 1a, 1b, 1c, etc., is connected to a plurality of generator aggregates. In the figure each switchgear is connected to ten generator aggregates, but the number can vary, where five to fifteen aggregates is an appropriate range. The number of switchgears 1a, 1b, 1c etc., connected to the primary intermediate station 17a in the illustrated embodiment is five, but any number within the range of two to ten would be appropriate.

The primary intermediate station 17a is by a cable 18 connected to a secondary intermediate station 19. The secondary intermediate station 19 is connected to ten primary intermediate stations 17a, 17b, 17c.

Figure 2:
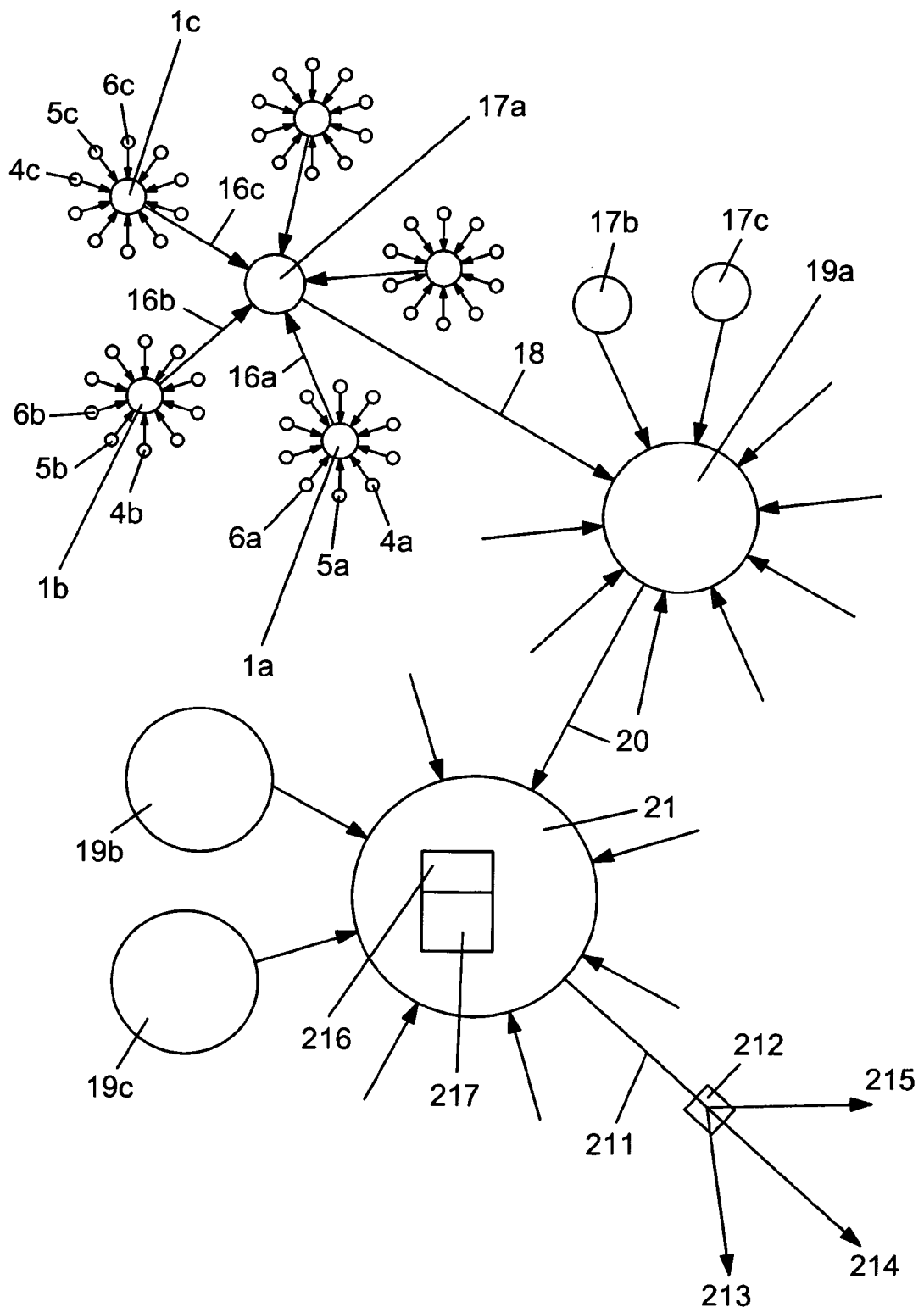
FIG. 2 is a scheme illustrating a system according to a second example of the invention.

The secondary intermediate station 19 is by a cable 191 connected to an electric network. By a switch 192 the secondary intermediate station 19 can be connected to different locations 193, 194, 195, etc., in the network. The secondary intermediate station 19 can be located either in the sea or on land. FIG. 2 illustrates an alternative example of the system. The system of FIG. 2 differs from that of FIG. 1 in that it is larger, including a larger number of generator aggregates 4a, 5a, 6a etc., and including a further level of the system. In the system of FIG. 2 the arrangement of the generator aggregates, the switchgears and the primary intermediate station is similar to that of FIG. 1. In FIG. 2 the intermediate secondary station 19a is one of plurality of secondary intermediate stations 19a, 19b, 19c, etc. Each of these secondary intermediate stations is connected to a pattern of generator aggregates, switchgears and primary intermediate stations similar to that of the secondary intermediate station 19a.

The secondary intermediate station 19a is by a cable 20 connected to a tertiary intermediate station 21. To the tertiary intermediate station 21 in a similar way a number of eight secondary intermediate stations 19a, 19b, 19c, etc., are connected. The tertiary intermediate station 21 is by a cable 211 connected to an electric network. In a similar way as in the example of FIG. 1, there is a switch 212 through which the tertiary intermediate station can be connected to different locations 213, 214, 215, etc.

The tertiary intermediate station 21 is provided with equipment establishing a superior control system 216 arranged to control the electric energy generating system. The station is also provided with equipment establishing a billing system 217, to provide for billing of the supplied energy.

In the system disclosed in FIG. 2 there are ten generator aggregates connected to each switchgear. A typical power level of each generator aggregate is about 10 kW, which means that the output from each switchgear is 100 kW. Each primary intermediate station is connected to five switchgears resulting in an output of 500 kW. Each secondary intermediate station is connected to ten primary intermediate stations resulting in an output of 5 MW. The tertiary intermediate station is connected to eight secondary intermediate stations resulting in an output of 40 MW to be supplied to the electric network.

Of course, the number of generator aggregates connected to each switchgear, the number of switchgears connected to each primary intermediate station, the number of primary intermediate stations connected to each secondary intermediate station and the number of secondary intermediate stations connected to the tertiary intermediate station can vary. The typical number of such connections can be within the range of 2-15 at each level. The number of connections within the system of course can vary for different levels and within the same level. The system also can be extended to further levels, employing a plurality of tertiary intermediate stations etc.

Figure 3:
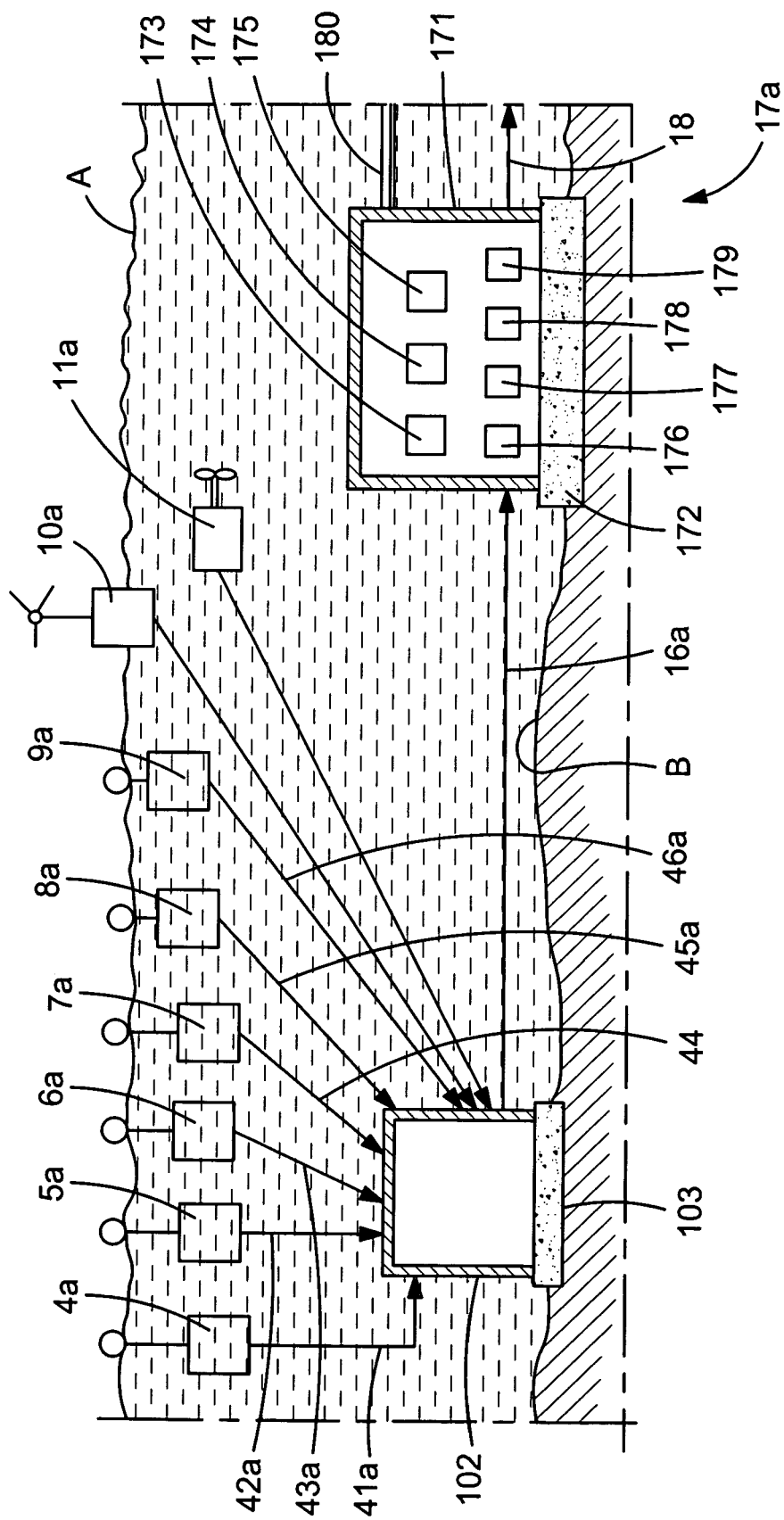
FIG. 3 is an illustration of certain components of the system of FIGS. 1 and 2.

FIG. 3 is a basic layout sketch illustrating the switchgear 1a connected to generator aggregates. The switchgear 1a is arranged resting on the sea bed B. The switchgear 1a consists of a watertight container formed by a housing 102 and a bottom plate 103 which may be of concrete, for instance. The switchgear 1a is anchored in the sea bed B. The generators 4a-9a of a number of wave-power units are connected to the switchgear station.

Each generator unit 4a-9a is electrically connected with the switchgear station 1a by cables 41a-46a which, via lead-ins through the housing 102, are connected to the components inside the switchgear station. The voltage is supplied from each unit as low voltage direct or alternating voltage.

The components in the switchgear station 1a are of conventional type and are not shown in the figures. These components may include semiconductors, converters, breakers, measuring devices, relay protection, surge diverters and other over-voltage protection devices, earthing means, load couplers or disconnectors, as well as transformers.

The switchgear station supplies an outgoing direct or alternating voltage, preferably high voltage, through outgoing cables 16a. The alternating voltage has low frequency and may be three phase or multiphase. Standard frequencies such as 50 or 60 Hz may also be used.

The incoming low voltage is converted to outgoing higher voltage by the transformer in the switchgear station. The converter or inverter in the switchgear station is used when necessary to convert DC-AC or vice versa.

The voltage from the switchgear 1a is supplied to a primary intermediate station 17a, as illustrated in FIG. 1.

The primary intermediate station 17a is anchored in the sea bed B and consists of a watertight container formed by a housing 171 and a bottom plate 172. The primary intermediate 17 a station can include various components only symbolically represented in the figure, i.e., a rectifier 173, an inverter 174, equipment for control and governing system 175, transformer 176, a relay protection device 177, equipment for a measuring system 178 and equipment for a signalling system 179. Such components can alternatively or complementary be present in the switchgears and in the intermediate stations at higher levels. An optical cable 180 is connected to the equipment for the signalling system 179 through which cable information signals can be sent to and from the primary intermediate station 17a. Other types of signalling means of course can be employed alternatively or complementary.

The generator aggregates 4a-9a of the FIG. 2 are illustrated as wave powered generators. The system, however applies to generators powered by wind or by streams in the water, such as illustrated by the aggregates 10a and 11a, respectively.

For the aggregates of the types represented by 10a and 11a normally a rotating generator is present, whereas for aggregates of the type represented by 4a to 9a a linear generator is appropriate.

Figure 4:
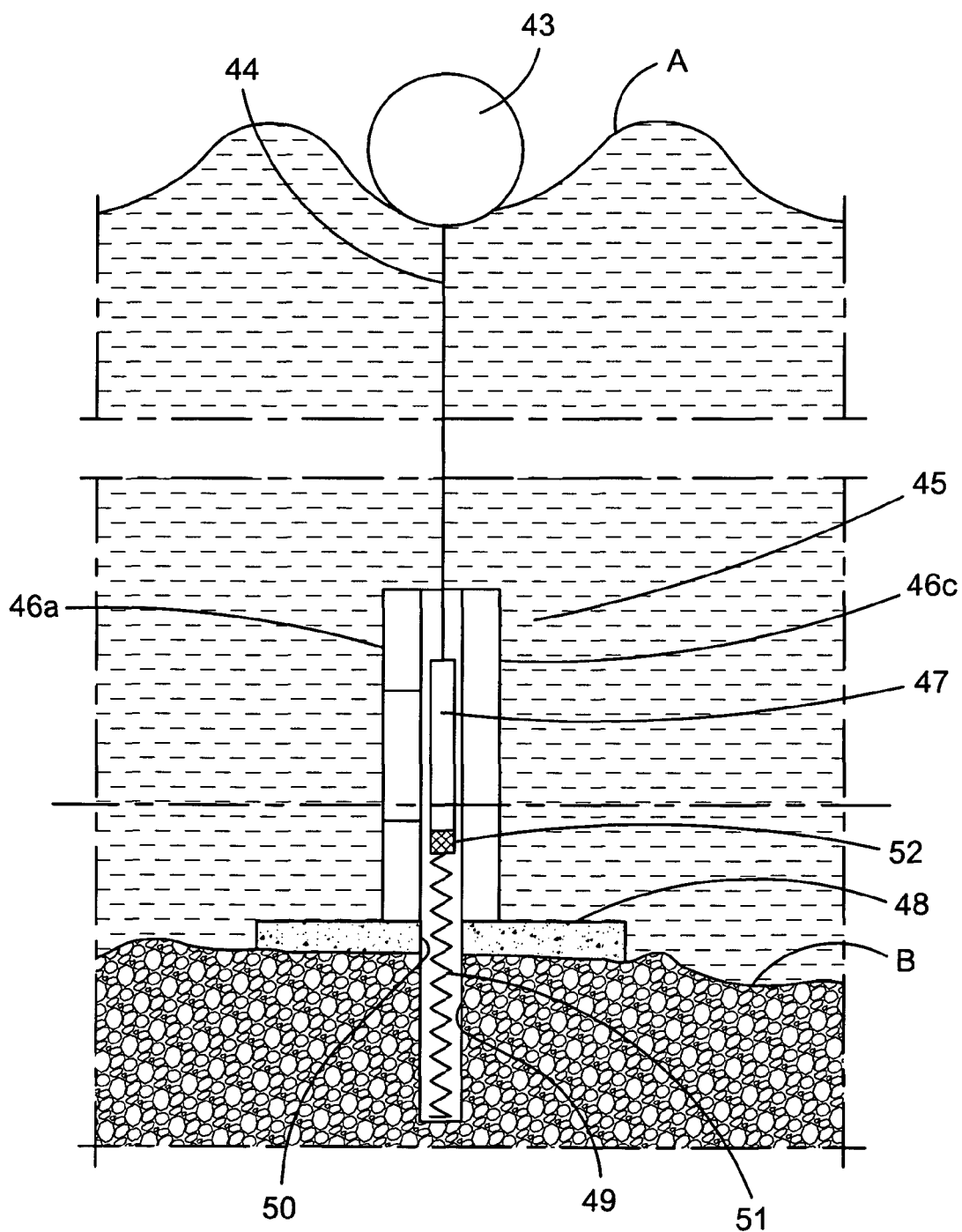
FIG. 4 is a side view of an example of a generator aggregate 4 in the system according to the invention.

Such an aggregate is illustrated in FIG. 4.

A floating body 43 is arranged to float on the surface A of the ocean. Waves impart a to-and-fro vertical movement to the floating body 43. A linear generator 45 is anchored at the sea bed via a base plate 48 secured in the bottom. The plate may be of concrete. The stator 46a, 46c of the linear generator is secured to the base plate 48. The stator consists of four vertical pillar-like laminated stacks, only two of which are visible in the figure. The reciprocating rotor 47 of the generator is arranged between the laminated stacks and is connected to the floating body 43 by a wire 24. The rotor 47 is of permanently magnetic material.

The base plate 48 has a centrally arranged hole 50 and concentrically with this, a bottom recess 49 is made in the sea bed. The recess 49 may suitably be lined. A tension spring 51 is secured at the lower end of the recess 49 and the other end of the spring is attached to the lower end 52 of the rotor 47. The diameter of the hole 50 in the base plate 48 and of the recess 49 is such that the rotor 47 can move freely through them.

When the floating body 43 moves up and down due to the movement of the waves in the surface A of the ocean, this movement is transmitted via the wire 44 to the rotor 47 which thus acquires an equivalent to-and-fro movement between the laminated stacks. Current is thus generated in the stator windings. The recess 49 permits the rotor to pass the whole stator in its downward movement. The tension spring 51 gives added force to the downward movement so that the wire 44 is kept taut at all times.

Figure 5:
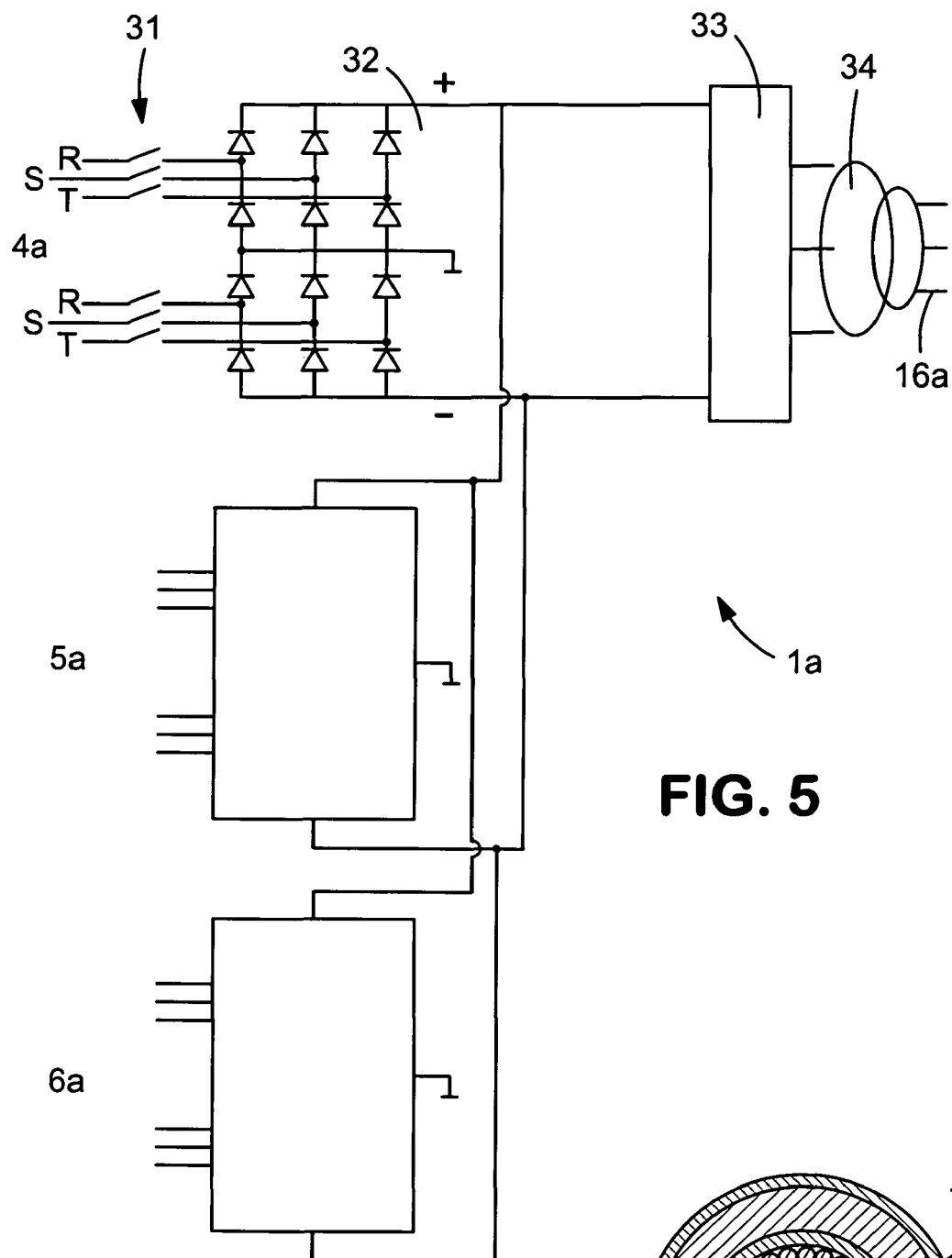
FIG. 5 is a scheme illustrating an example of important components of switchgear in the system according to the invention

FIG. 5 illustrates a possible layout of the interior of the switchgear 1a. In the example shown the switchgear 1a is connected to three aggregates 4a, 5a, 6a. Each aggregate is connected via a breaker or contactor 31 and a rectifier 32 to an inverter 33 in a bipolar connection according to the figure. The circuit diagram is only drawn in for the aggregate 4a. It will be understood that the other aggregates 5a, 6a are connected in a corresponding manner. The inverter 33 supplies three-phase current tot the electric cables 16a, possibly via a transformer 34 and/or a filter. The rectifiers may be diodes which may be controlled and of type IGBT, GTO or thyristors, comprise controlled bipolar components or not be controlled.

The voltages on the DC side may be connected in parallel or in series, or a combination of both.

Figure 6:
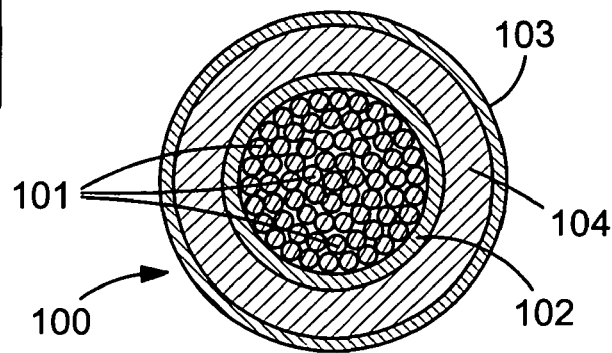
FIG. 6 is a cross section of a cable and a stator winding in a generator aggregate in a system according to the invention.

FIG. 6 is a section through a cable 100 forming the stator winding in the generator aggregates 4a, 5a, 5b etc. Outside the conducting part 101 of the cable, there is a solid insulation including an inner semiconducting layer 102, an outer semiconducting layer 104 and an intermediate insulation layer 103.

The invention claimed is:

1. An electric energy generating system for supplying electric energy to a land-based electric network, said electric generating system comprising:
   a plurality of generator aggregates located in a body of water,
   a plurality of switchgears located in said body of water, each switchgear of said plurality of switchgears being connected to at least two of said generator aggregates,
   a plurality of primary intermediate stations located in said body of water, each primary intermediate station of said plurality of primary intermediate stations being associated with at least two of said switchgears, each primary intermediate station comprising a watertight container housing at least two components selected from the group consisting of a rectifier, an inverter, equipment for system control and governing, a transformer, a relay-protection device, apparatus for a measuring system, and apparatus for a signaling system,
   first electrical connections between said at least two components of each primary intermediate station and said at least two switchgears to which said primary intermediate station is associated,
   a plurality of secondary intermediate stations, each secondary intermediate station of said plurality of secondary intermediate stations being connected to a plurality of said primary intermediate stations, each said secondary intermediate station comprising at least two components selected from the group consisting of a rectifier, an inverter, equipment for system control and governing, a transformer, a relay-protection device, apparatus for a measuring system, and apparatus for a signaling system,
   second electrical connections between said at least two components of each said secondary intermediate station and said at least two primary intermediate stations to which said secondary intermediate station is associated,
   a tertiary intermediate station, the tertiary intermediate station being connected to a plurality of said secondary intermediate stations, and
   switching means connectable between said tertiary intermediate station and locations in the electric network.

2. The system according to claim 1, wherein said tertiary intermediate station is located in the body of water.

3. The system according to claim 1, wherein each switchgear includes a watertight container fixed to the bed of the body of water, the container housing at least some switchgear components.

4. The system according to claim 1, wherein at least some of the generator aggregates include wave powered means.

5. The system according to claim 4, wherein the generator of at least some of the wave power generator aggregates is a linear generator having a reciprocating rotor including permanent magnets.

6. The system according to claim 1, wherein at least some of the generator aggregates are generators powered by wind.

7. The system according to claim 1, wherein at least some of the generator aggregates are generators powered by underwater currents.

8. The system according to claim 1, including AC/DC-rectifiers and/or DC/AC-inverters, the rectifiers/inverters being housed in the switchgears and/or in the intermediate stations.

9. The system according to claim 8, wherein at least some of the primary intermediate stations are provided with a control and governing system for parts of the system operating with direct current.

10. The system according to claim 8, wherein at least some of the rectifiers include a diode or thyristor bridge.

11. The system according to claim 1, wherein at least some of the switchgears and/or the intermediate stations include a transformer.

12. The system according to claim 1, wherein generator aggregates are connected to the switchgears by AC-cables.

13. The system according to claim 1, wherein the connections between the switch gears and the primary intermediate stations and/or the connections between the intermediate stations include AC-cables.

14. The system according to claim 1, wherein the connections between the switch gears and the primary intermediate station and/or the connections between the intermediate stations include DC-cables.

15. The system according to claim 1, wherein at least one of said secondary or tertiary intermediate stations is land based and includes a superior control system arranged to control the system for generating electric energy.

16. The system according to claim 1, wherein at least one said secondary or tertiary intermediate stations is land based and includes a billing system.

17. The system according to claim 1, wherein at least some of said switchgears and/or said intermediate stations include a relay protection device.

18. The system according to claim 17, wherein said relay protection device is a differential protection or a surge protection.

19. The system according to claim 1, wherein at least some of said switchgears and/or said intermediate stations include a measuring system arranged to measure current related parameters.

20. The system according to claim 1, wherein the system includes a signalling system arranged to transmit information signals to and from at least some of the switchgears and intermediate stations.

21. The system according to claim 20, wherein the signalling system includes signalling means selected from the group consisting of optical fibre, cable, acoustic signalling means, radio signalling means and floats.

22. The system according to claim 1, wherein a stator winding of at least some of the generator aggregates include a cable having solid insulation, the solid insulation including an inner semiconducting layer, an outer semiconducting layer and an intermediate insulating layer.

23. A method for supplying electric energy to an electric network wherein by connecting a system according to claim 1 to the electric network.

* * * * *